April 6, 1965        W. H. ANDERSON        3,177,030
CAMPING TRAILER
Filed Oct. 21, 1963        4 Sheets-Sheet 1
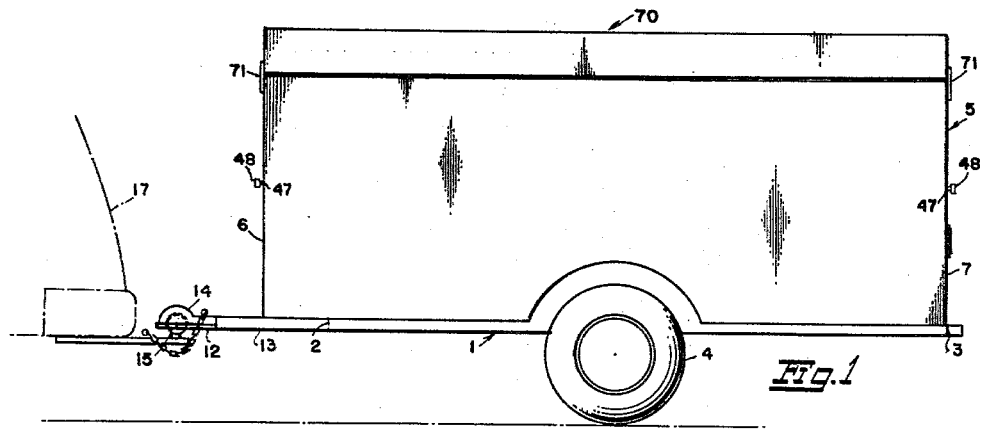
WILLIAM H. ANDERSON
*INVENTOR.*
BY *James D. Heiman*
ATT'Y

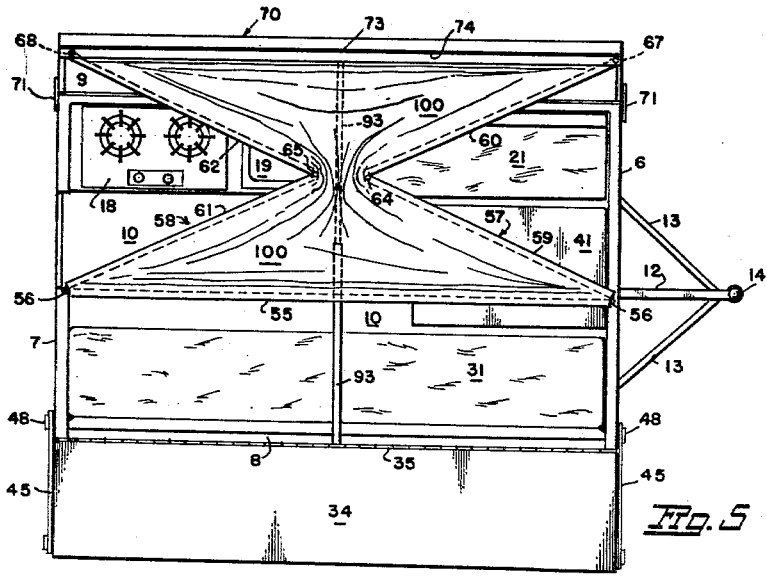

April 6, 1965 W. H. ANDERSON 3,177,030
CAMPING TRAILER
Filed Oct. 21, 1963 4 Sheets-Sheet 3
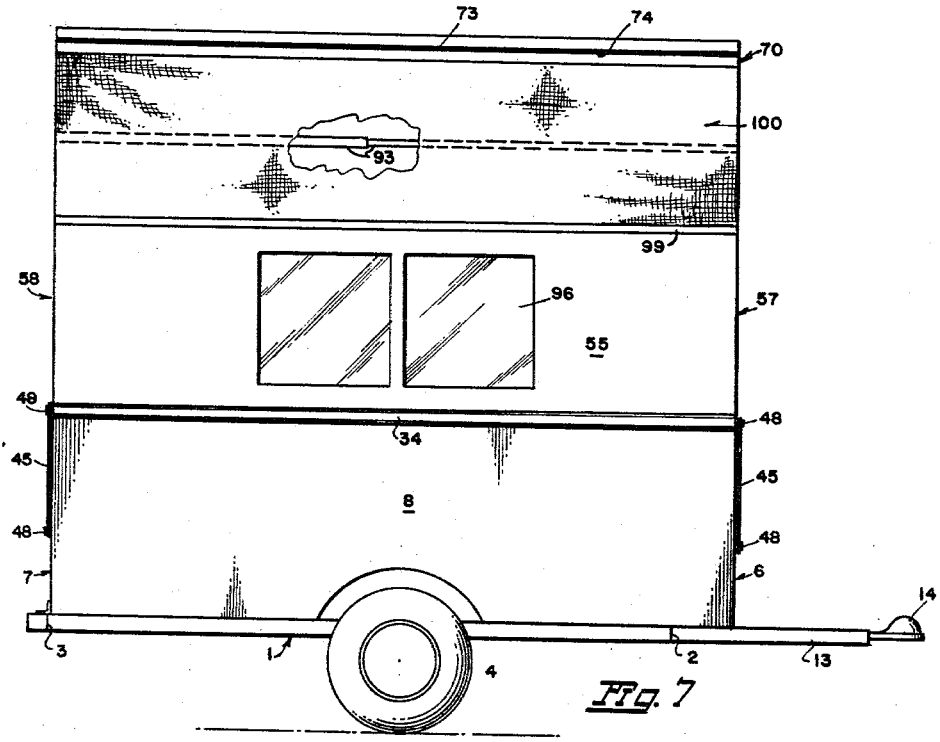
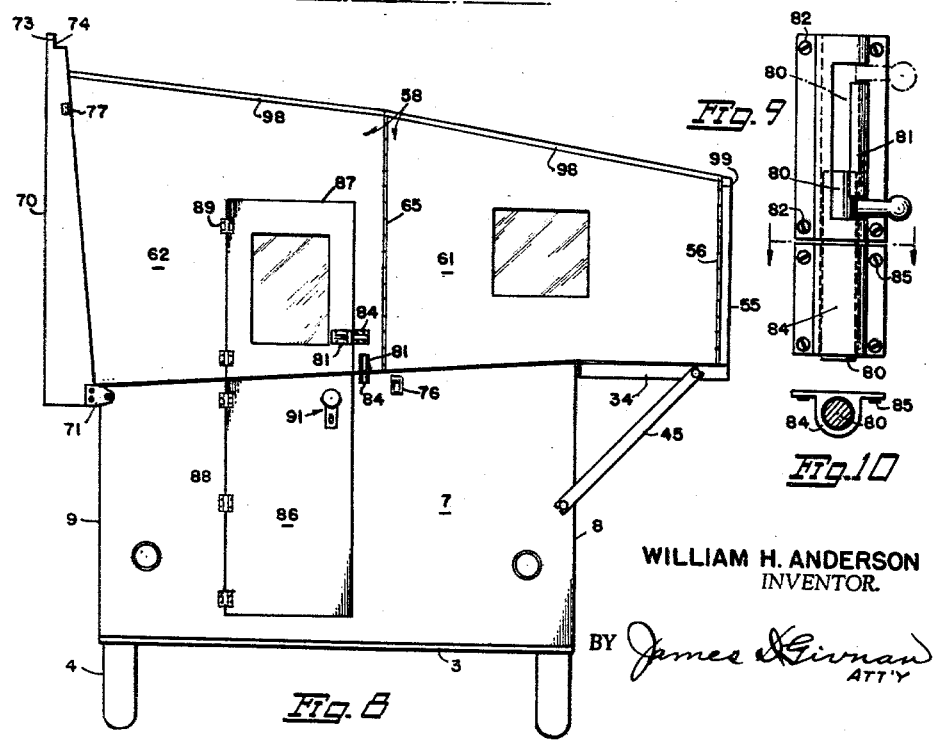
WILLIAM H. ANDERSON
INVENTOR.
BY James A. Givnan
ATT'Y April 6, 1965   W. H. ANDERSON   3,177,030
CAMPING TRAILER
Filed Oct. 21, 1963   4 Sheets-Sheet 4
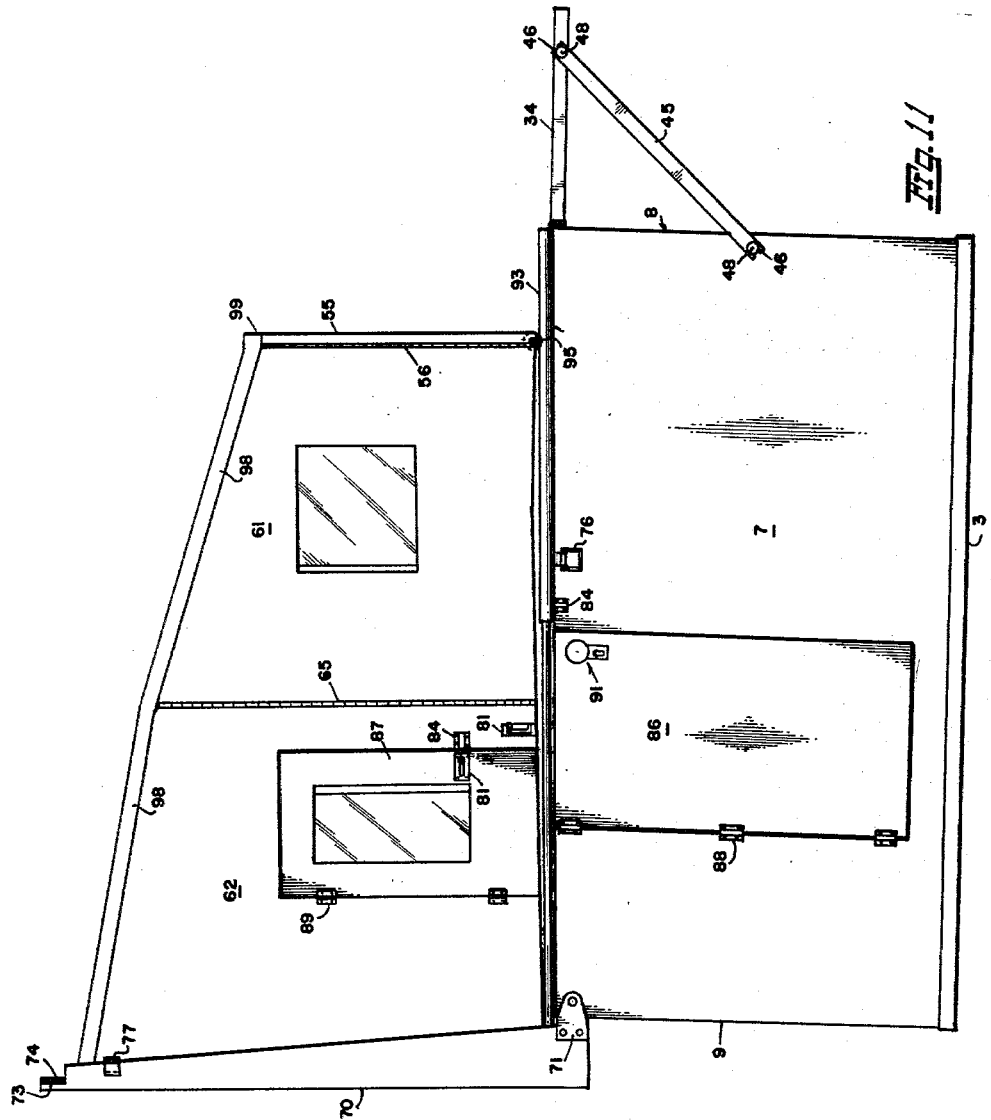
WILLIAM H. ANDERSON
INVENTOR.

United States Patent Office 3,177,030
Patented Apr. 6, 1965

3,177,030
CAMPING TRAILER
William H. Anderson, 850 NE. 122nd, Portland, Oreg.
Filed Oct. 21, 1963, Ser. No. 317,479
3 Claims. (Cl. 296—23)

This invention relates to improvements in camping trailers and has among its objects:

To provide a trailer of the character described which is of strong durable compact construction and of a weight light enough so that it can be towed about by sport cars, compact cars and the like without imposing undue stresses on the engines, transmissions, brakes, springs or other running gear of such towing vehicles.

To provide a trailer which is readily expansible from its compact running condition to spacious sleeping quarters and also for cooking, eating and other activities.

To provide a trailer having relatively large fibre glass windows to provide ample 3-way controlled ventilation.

To provide a trailer which when fully expanded as aforesaid can be quickly and conveniently collapsed to a compact running condition with a minimum of effort on the part of a user and when so collapsed will be solid in assembly and silent and stable in its travel under all road conditions.

The foregoing and other objects and advantages which will become subsequently apparent reside in the details of construction and operation as more fully hereinafter described and claimed, reference being had to the accompanying drawings forming a part thereof and in which:

FIGURE 1 is a side elevational view of a camping trailer made in accordance with my invention shown in a fully collapsed position.

FIGURES 2 and 3 are front and rear elevational views respectively, of FIGURE 1.

FIGURE 4 is a top plan view of the trailer in an extended open position.

FIGURE 4A is a fragmentary sectional detail view taken approximately along the line 4A—4A of FIGURE 4, with the seat and backrest cushions of FIG. 4 transposed to provide the two-piece bunk mattress shown in FIG. 4A.

FIGURE 5 is a view similar to FIGURE 4 showing the top portion of the trailer in a partially folded position.

FIGURE 6 is a view similar to FIGURE 5 showing the top portion in a fully extended position.

FIGURE 7 is a view similar to FIGURE 1 showing the trailer in a fully extended position and ready for occupancy.

FIGURE 8 is an elevational view of the left or rearward end of FIGURE 7.

FIGURE 9 is a front elevational view of a typical locking mechanism.

FIGURE 10 is a sectional top plan view taken along the line 10—10 of FIGURE 9, and FIGURE 11 is a view similar to FIGURE 8 showing on a slightly enlarged scale the top portion of the trailer in the process of being collapsed.

With continuing reference to the drawings wherein like reference characters designate like parts, reference numeral 1 indicates generally a chassis having a forward end 2, a rearward end 3 and supported upon ground-engaging wheels 4.

The main body 5 of the trailer is of box-like formation having a front wall 6, rear wall 7, side walls 8 and 9 and a bottom wall or floor 10 (see FIGURE 4).

The forward end of the chassis 1 is provided with a drawbar 12, re-enforced by diagonal braces 13 and terminating at its outer end in one member 14 of a trailer hitch for coupling with a companion trailer hitch member 15 secured to and extending rearwardly in the conventional manner from a towing vehicle indicated generally at 17 in FIGURE 1.

As best illustrated in FIGURES 4, 4A and 5, the interior of the trailer body is equipped on one of its sides with any suitable type of stove 18, sink 19 and a cabinet 20 whose top wall is provided with a seat cushion 21 and a backrest cushion 22.

The opposite inside of the trailer body (see also FIGURE 4A) is provided with a storage cabinet 23 extending full length thereof and comprising a top wall 24 supported upon cross members 25 and uprights 26. A full length door or closure 28 is hingedly attached as at 29 at its top edge to the cross members 25 and thereby swingable upwardly from the broken line closed position to the upwardly and outwardly extended open position shown in full lines.

The cabinet closure 28 is supported in its horizontal bunk-forming position by any desired number of uprights 30 which when not in use may be conveniently stored within the cabinet 23. By this arrangement a double lower bunk is provided and a two-piece mattress for this bunk is provided by moving the seat cushion 31 from its location in FIG. 4 outwardly onto the outwardly extended closure 28 and the backrest cushion 32 from its vertical location in FIG. 4 downwardly into a horizontal position upon the top wall 25 of the cabinet as shown in FIG. 4A.

An upper bunk is provided by a shelf 34 hingedly attached along the top edge of the side wall 8 throughout the length thereof by a piano hinge 35. Cooperating with the shelf 34 to provide a double upper bunk similar to the lower bunk is a backrest 36 for the seat-forming top wall 24 of the cabinet 23. This bracket is hingedly attached as at 37 to the inside top edge of the wall 8 and is thereby swingable upwardly from the broken line position to the horizontal outwardly extending full line position, as shown. Mattresses 38 and 39 substantially co-extensive in length and width with the shelves 34 and 36 are unrolled from normal storage within the cabinet 23.

Disposed centrally of the trailer body and hingedly attached as at 40 to the front wall thereof is a table top 41 supported when in use by a conventional leg (not shown) hingedly attached to the underside of the table top near the free end thereof in the conventional manner so that if desired the table top may be swung downwardly out of the way when the upper and lower bunks are set up for use as aforesaid.

As best illustrated in FIGURE 11, the shelf 34 is rigidly supported in its horizontal bunk-forming position by diagonal struts 45 each bifurcated at both of its ends as at 46 to removably straddle bolts 47 back of the heads 48 thereof. The bolts are driven in the ends of the shelf 46 near the outer edge thereof and into the end walls 6 and 7 of the trailer body 5. When the struts are not in use for this purpose they can also be stored within the cabinet 23.

Uprights 50 similar to those indicated at 30 may be utilized for supporting the shelf 36 in its horizontal bunk-forming position and when not so used may also be stored within the cabinet 23.

The superstructure (see FIG. 5) for the trailer body 5 comprises a sidewall 55 hingedly attached as at 56 at both of its ends to front and rear walls indicated generally at 57 and 58 each of which is made in two sections 59–60 and 61–62 respectively. The sections 59–60 are hingedly interconnected at their inner ends as at 64, and the sections 61–62 as at 65 (see FIGS. 4, 5, 8 and 11).

The outer ends of the sections 60 and 62 (see FIG.

5) are hingedly interconnected respectively as at 67 and 68 to the inside of a box-like closure 70 for the main body of the trailer. This closure is hingedly attached as at 71 at both of its outer ends to top corners of the front and rear walls 6 and 7 of the main body 5 and is under-cut as at 73 along its free edge and therealong provided with weather stripping 74. When the closure 70 is in the closed position shown in FIGURES 2 and 3 its undercut weather stripping edge 73 overlaps the inwardly swung free edge of the shelf 34 which completes a water-tight overall closure for the main body 5. For locking both closures in said water-tight relation to each other I provide the front and rear walls 6 and 7 of the main body with one member 76 of a latch, similar to a trunk latch, for locking engagement with a companion latch member 77 carried by the corresponding ends of the closure 70.

For locking the sectional front and rear walls 57 and 58 of the superstructure in their fully extended position as shown in FIGURE 8 I provide, as best illustrated in FIGURES 9 and 10, a locking bolt 80 slidably mounted in a vertically disposed bracket 81 secured as at 82 to each of the sections 60 and 62 of the front and rear walls. The locking bolt 80 is slidable downwardly into and upwardly out of a keeper bracket 84 secured as at 85 to the front and rear walls 6 and 7 of the main body of the trailer.

The rear wall 7 of the main body 5 of the trailer and the section 62 of the rear wall 58 of the superstructure are provided with cooperating door sections 86 and 87, respectively, hingedly mounted as at 88 and 89. The bottom door section 86 is provided with a conventional door knob and lock set indicated generally at 91 and the upper door section 87 is provided with the locking bolt assembly 81 and 84 as shown and described in FIGURES 9 and 10.

For further reenforcing the front and rear sections walls 57 and 58 in their fully extended positions as shown in FIGURE 7 I provide a telescopic pole for 93 springed into an extended position to bear at both of its ends respectively against either of the sections 59 and 61 or 60 and 62 of the front and rear walls of the superstructure.

In collapsing the superstructure for folded storage within the box-like closure section 70 I utilized the pole 93 for handling the superstructure in a position of sufficiently rearward tilt to clear the front and rear walls of the main trailer body 5. In such use of the rod 93 I place one of these ends upon the top edge of the side wall 8 of the trailer body and its opposite end within the closure 70 centrally thereof. And to facilitate such fold of the superstructure I provide the bottom edge of the side wall 55 of the structure with a V-pulley 95 of sufficient width for stability rolling engagement with the pole 93. For holding the front and rear folding wall sections within the closure 70 I place the pole 93 across the sections as shown in FIGURE 4 with the ends of the pole bearing against the front and rear walls of the closure.

The side wall 55 as well as the end wall sections 59, 60 and 61 may be provided with any desired numbers of windows indicated generally at 96.

Secured in any suitable weather-proof manner to the interior of the free end of the closure 70, along the top marginal edges of the sectional end walls 58–59, as at 98, and across the top marginal edge of the side wall 55, as at 99, is a roof 100 of water-repellent treated duck material which is readily collapsible and extendible with the corresponding movement of wall components of the superstructure and which roof when extended as shown in FIGURES 8 and 11 will be held taut to seal out rain and stabilized against fluttering in the wind and also provide adequate drainage.

While I have shown a particular form of embodiment of my invention, I am aware that many minor changes therein will readily suggest themselves to others skilled in the art without departing from the spirit and scope of the invention.

Having thus described my invention what I claim as new and desire to protect by Letters Patent is:

1. A camping trailer comprising in combination an upwardly opening unitary main body mounted upon ground engaging wheels and having front, rear, side, and bottom walls,
   a superstructure comprising interengageable first and second closure members for said main body,
   means hingedly attaching said first closure member to one of said side walls for movement from a closed horizontal position relative thereto to a substantially vertical open position,
   means hingedly attaching the second closure member to the other of said side walls for movement from a horizontal position of engagement with said first closure member when closed to an open horizontal position on the exterior of its respective said side wall,
   foldable sectional front and rear walls, and a unitary movable side wall.
   means hingedly interconnecting said front and rear walls with said unitary side wall and with said first closure member whereby said superstructure can be extended to position said front and rear sectional walls in a common vertical plane with said front and rear walls of the trailer body and said unitary movable side wall into engagement with the outer edge of said second closure member when the same is in said open horizontal position, and
   a flexible cover attached to the top edges of said first closure member and to said foldable front and rear wall sections and to said movable unitary side wall for movement therewith from an extended position to a collapsed position within the area of said first closure member.

2. A camping trailer as claimed in claim 1 including a longitudinally extensible pole adapted to extend across and rest upon both of said side walls of the trailer body to frictionally support said unitary movable side wall and its related parts in collapsing movement toward and against said first closure member and to retain the same thereagainst when said first closure member is in a closed horizontal position.

3. A camping trailer as claimed in claim 1 including a storage cabinet extending full length of said other of said side walls of the trailer body and having a top wall and a normally vertically disposed closure therefore, means hingedly attaching said closure to said top wall for swinging said closure upwardly into a common horizontal plane with said top wall,
   uprights associated with said closure for maintaining the same in said horizontal plane,
   a backrest,
   means hingedly attaching said backrest to the top edge of said other of said side walls for swinging the backrest into a common horizontal plane with said second closure member, and,
   uprights associated with said backrest for maintaining the same in said horizontal plane with said second closure member.

References Cited by the Examiner

UNITED STATES PATENTS 3,001,813  9/61  Johnson _____ 296—23

FOREIGN PATENTS 998,255  9/51  France.

A. HARRY LEVY, *Primary Examiner.*